United States Patent
Knee (10) Patent No.: US 8,224,125 B2
(45) Date of Patent: Jul. 17, 2012

(54) METHOD AND APPARATUS FOR SPATIAL INTERPOLATION OF COLOR IMAGES

(75) Inventor: Michael James Knee, Petersfield (GB)

(73) Assignee: Amstr. Investments 5 K.G., LLC, Wilmington, DE (US)

( * ) Notice: Subject to any disclaimer, the term of this patent is extended or adjusted under 35 U.S.C. 154(b) by 1240 days.

(21) Appl. No.: 11/915,615

(22) PCT Filed: Jun. 1, 2006

(86) PCT No.: PCT/GB2006/002000
§ 371 (c)(1),
(2), (4) Date: Nov. 27, 2007

(87) PCT Pub. No.: WO2006/129096
PCT Pub. Date: Dec. 7, 2006

(65) Prior Publication Data
US 2008/0199105 A1    Aug. 21, 2008

(30) Foreign Application Priority Data
Jun. 1, 2005  (GB) .................................. 0511195.0

(51) Int. Cl.
G06K 9/32  (2006.01)
(52) U.S. Cl. ......... 382/300; 382/260; 382/261; 382/167
(58) Field of Classification Search .................. 382/300, 382/260, 261, 167
See application file for complete search history.

(56) References Cited

U.S. PATENT DOCUMENTS

| | | |
|---|---|---|
| 4,223,342 A | 9/1980 | Tsuchiya et al. |
| 4,626,894 A | 12/1986 | Harwood et al. |
| 4,651,196 A | 3/1987 | Harwood et al. |
| 4,864,389 A | 9/1989 | Faroudja et al. |
| 5,287,419 A * | 2/1994 | Sato et al. ..................... 382/252 |

(Continued)

FOREIGN PATENT DOCUMENTS

EP    1083753    3/2001

(Continued)

OTHER PUBLICATIONS

Effective color-correlation, Pei et al., IEEE, 1051-8215, 2003, pp. 503-513.*

(Continued)

Primary Examiner — Jayesh A Patel
(74) Attorney, Agent, or Firm — Knobbe Martens Olson & Bear LLP (57) ABSTRACT

This invention concerns the spatial interpolation of color images and, in particular, the reconstruction, or "de-mosaicing" of data from a single sensor-array electronic camera.

Electronic cameras typically have an image sensor comprising a matrix of individual pixel sensors, each sensor being responsive to a color component. In order to obtain color component information for all pixels, in accordance with the disclosed embodiment, green component pixel values (203) are interpolated to obtain green component pixel values for all pixels (209). A difference value (B–G) (212) is formed from the green color component values (207) and the original blue component values (204) at blue pixel locations, and the difference values (B–G) (212) are then interpolated to obtain difference values for all pixels (216). Blue component values for all pixels (225) can then be obtained from the difference values for all pixels (216) and the green component values for all pixels (209).

15 Claims, 5 Drawing Sheets

U.S. PATENT DOCUMENTS

| | | | | |
|---|---|---|---|---|
| 5,382,976 | A * | 1/1995 | Hibbard | 348/273 |
| 5,552,827 | A * | 9/1996 | Maenaka et al. | 348/266 |
| 5,652,621 | A * | 7/1997 | Adams et al. | 348/272 |
| 5,841,485 | A | 11/1998 | Steinberg | |
| 6,091,862 | A * | 7/2000 | Okisu | 382/300 |
| 6,563,537 | B1 * | 5/2003 | Kawamura et al. | 348/252 |
| 6,570,616 | B1 * | 5/2003 | Chen | 348/272 |
| 6,625,325 | B2 * | 9/2003 | Gindele et al. | 382/260 |
| 6,628,330 | B1 * | 9/2003 | Lin | 348/252 |
| 6,636,629 | B1 * | 10/2003 | Sasai | 382/167 |
| 6,744,916 | B1 * | 6/2004 | Takahashi | 382/162 |
| 6,823,086 | B1 * | 11/2004 | Dolazza | 382/261 |
| 6,836,289 | B2 * | 12/2004 | Koshiba et al. | 348/273 |
| 6,847,396 | B1 * | 1/2005 | Lin | 348/273 |
| 6,882,365 | B1 * | 4/2005 | Aoki | 348/273 |
| 6,904,180 | B1 * | 6/2005 | Gallagher | 382/280 |
| 6,917,381 | B2 * | 7/2005 | Acharya et al. | 348/252 |
| 6,970,597 | B1 * | 11/2005 | Olding et al. | 382/167 |
| 7,053,944 | B1 * | 5/2006 | Acharya et al. | 348/273 |
| 7,206,021 | B2 * | 4/2007 | Sasaki et al. | 348/277 |
| 7,551,214 | B2 * | 6/2009 | Hasegawa | 348/280 |
| 7,652,700 | B2 * | 1/2010 | Takahashi et al. | 348/273 |
| 7,671,910 | B2 * | 3/2010 | Lee | 348/272 |
| 7,706,609 | B2 * | 4/2010 | Bennett et al. | 382/167 |
| 7,710,437 | B2 * | 5/2010 | Kang | 345/606 |
| 7,714,900 | B2 * | 5/2010 | Chiu | 348/222.1 |
| 2002/0167602 | A1 * | 11/2002 | Nguyen | 348/280 |
| 2003/0086606 | A1 * | 5/2003 | Hunter et al. | 382/167 |
| 2003/0156214 | A1 * | 8/2003 | Guimaraes et al. | 348/342 |
| 2004/0179752 | A1 * | 9/2004 | Cheng et al. | 382/300 |
| 2006/0078229 | A1 * | 4/2006 | Huang et al. | 382/300 |
| 2006/0176375 | A1 * | 8/2006 | Hwang et al. | 348/222.1 |
| 2007/0153106 | A1 * | 7/2007 | Subbotin | 348/272 |
| 2007/0236580 | A1 * | 10/2007 | Baqai et al. | 348/222.1 |

FOREIGN PATENT DOCUMENTS

| | | |
|---|---|---|
| EP | 1083753 A2 * | 3/2001 |
| EP | 1289310 | 3/2003 |
| EP | 1289310 A2 * | 3/2003 |
| JP | 4-150595 | 5/1992 |

OTHER PUBLICATIONS

Effective color-correlation, Pei et al., IEEE, 1051-8215, 2003, pp. 503-513.*

Adaptive-algorithm, Hirakawa et al., IEEE, 1057-7149, 2005, pp. 360-369.*

European Search Report; Application No. 06744059.4, dated Feb. 15, 2010.

First Office Action for Chinese Patent Application No. 200680018817.5, filed Jun. 1, 2006, dated Apr. 24, 2009.

Second Office Action for Chinese Patent Application No. 200680018817.5, filed Jun. 1, 2006, dated Apr. 14, 2010.

* cited by examiner

| G | R | G | R | G | R | G | R |
|---|---|---|---|---|---|---|---|
| B | G | B | G | B | G | B | G |
| G | R | G | R | G | R | G | R |
| B | G | B | G | B | G | B | G |
| G | R | G | R | G | R | G | R |

METHOD AND APPARATUS FOR SPATIAL INTERPOLATION OF COLOR IMAGES

CROSS-REFERENCE TO RELATED APPLICATIONS

This application is a National Phase Application of PCT International Application No. PCT/GB2006/002000, International Filing Date Jun. 1, 2006, claiming priority of Great Britain Patent Application No. 0511195.0, filed Jun. 1, 2005, both of which are incorporated herein by reference.

FIELD OF THE INVENTION

This invention concerns the spatial interpolation of colour images and, in a particular example, the reconstruction, or "de-mosaicing" of data from a single sensor-array electronic camera.

BACKGROUND OF THE INVENTION

Figure 1:
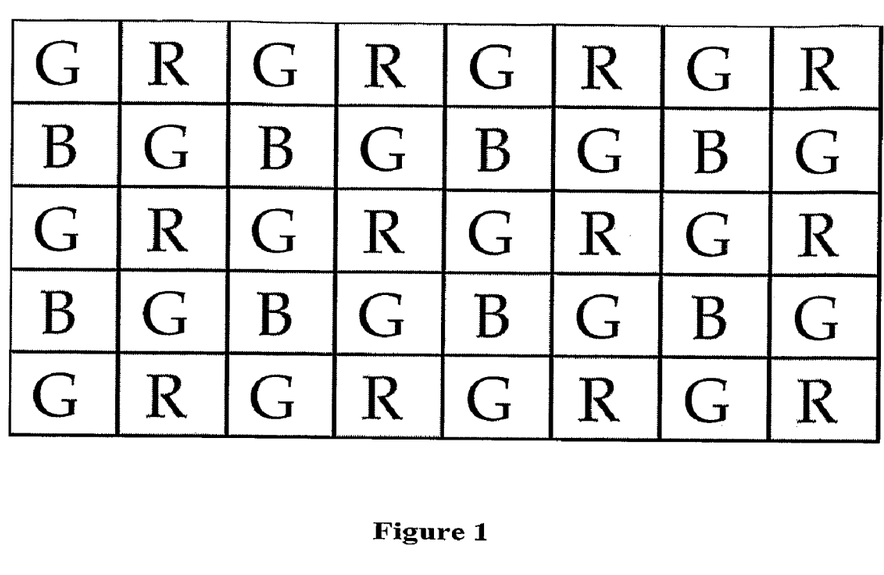
FIG. 1 shows the known "Bayer Mask" pattern.

It is now common for electronic colour cameras to have an image sensor comprising a matrix of individual pixel sensors where each pixel sensor has a colour filter in front of it so that different sensors respond to different colour components. Typically red, green and blue filters are used, although other filter colours have been proposed. Often the green pixels are more numerous than either the red or blue pixels so that the spatial sampling frequency is highest for the green component. A well-known arrangement is the "Bayer Mask" pattern of red green and blue pixels in which half of the total number of pixels have green filters, one quarter have red filters and one quarter have blue filters. This pattern is shown in FIG. 1.

Although spatial sub-sampling of colour components is not unusual in image processing, it is highly inconvenient if the samples from the respective colour components are not co-sited; and, many processes require a value for every component of every pixel in the image. There is therefore a need to spatially interpolate the colour component images from cameras using Bayer Mask, or similar, sensor patterns to obtain co-sited, fully-sampled pixel values.

Many solutions to this problem have been proposed including simple, bilinear interpolation of individual colour components and complex, adaptive filtering schemes. The simpler systems suffer from lack of image sharpness or aliassing, and even complex systems can suffer from "false colour" effects when objects have structures or textures similar to the colour filter pattern of the camera.

SUMMARY OF THE INVENTION

In accordance with one aspect of the invention, there is provided a method of spatially interpolating pixel values of an image, wherein first colour component pixel values of the image are spatially interpolated by making use of second colour component pixel values of the said image, the second colour component pixel values not being co-sited with the first colour component pixel values, comprising the steps of: spatially interpolating the second colour component pixel values so as to obtain, at least, second colour component pixel values co-sited with the first colour component pixel values; deriving an intermediate value from each interpolated second colour component pixel value and the respective co-sited first colour component pixel value; spatially interpolating the intermediate values to obtain intermediate values at, at least, the locations of the second colour component pixel values; and combining the said intermediate values with the said second colour component pixel values to obtain spatially interpolated pixel values of the first colour component.

Additionally, third colour component pixel values of the image may also be spatially interpolated by making use of second colour component pixel values of the said image, the second colour component pixel values not being co-sited with the third colour component pixel values, wherein the step of spatially interpolating the second colour component pixel values includes obtaining second colour component pixel values co-sited with third colour component pixel values; further comprising the steps of: determining a second intermediate value from each interpolated second colour component pixel value and the respective co-sited third colour component pixel value; spatially interpolating the second intermediate values to obtain second intermediate values at, at least, the locations of the second colour component pixel values; and combining the said second intermediate values with the said second colour component pixel values to obtain spatially interpolated pixel values of the third colour component.

In accordance with a second aspect of the invention, there is provided an apparatus for spatially interpolating pixel values of an image, wherein first colour component pixel values of the image are spatially interpolated by making use of second colour component pixel values of the said image, the second colour component pixel values not being co-sited with the first colour component pixel values, comprising: means for spatially interpolating the second colour component pixel values so as to obtain, at least, second colour component pixel values co-sited with the first colour component pixel values; combining means for forming an intermediate value from the interpolated second colour component pixel value and the respective co-sited first colour component pixel value; means for spatially interpolating the intermediate values to obtain intermediate values at, at least, the locations of the second colour component pixel values; and combining means for combining the said intermediate values with the said second component pixel values to obtain spatially interpolated pixel values of the first colour component.

Preferably the second colour component pixel values are more numerous than first colour component pixel values.

Suitably the intermediate values and/or the second intermediate values may be difference values.

Suitably, the filter aperture used to spatially interpolate the said second colour component pixel values is larger than the filter aperture used to interpolate the said intermediate values.

Advantageously, the filter aperture used to spatially interpolate the said second colour component pixel values has at least one negative coefficient value.

Advantageously, the filter aperture used to interpolate the said intermediate values has no negative coefficient values.

Advantageously, the filter used to spatially interpolate the said second colour component pixel values has a non-variables-separable spatial frequency response.

Advantageously, the shape of the spatial frequency response of the filter used to spatially interpolate the said second colour component pixel values is related to the pattern of its input pixel values, so that the direction of lowest spatial frequency response of the said filter corresponds to the direction of lowest spatial frequency of the said pattern of input pixel values.

Suitably, the second colour component pixel values are interpolated by a diagonal filter.

Suitably, the second colour component is Green and the first colour component is Blue.

Suitably, the second colour component is Green and the first colour component is Red.

The pixels may be derived from a Bayer Mask.

In yet a further aspect, the present invention consists in apparatus comprising a monochromatic image sensor array, a filter arrangement disposed in relation to the sensor array to provide colour discrimination and a processor constructed and adapted to spatially interpolate pixel values in a method as above defined.

BRIEF DESCRIPTION OF THE DRAWINGS

An example of the invention will now be described with reference to the drawings in which.

DETAILED DESCRIPTION OF THE INVENTION

Figure 4:
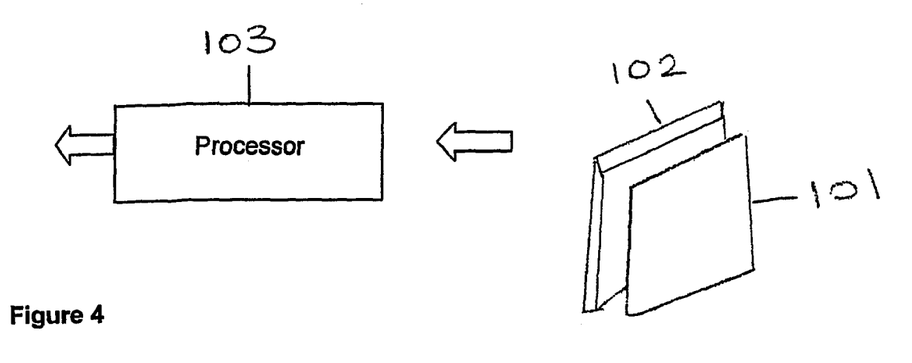
FIG. 4 shows diagrammatically the arrangement of a sensor array and a Bayer Mask.

The invention will now be described in the context of the spatial interpolation of pixel values from a Bayer mask pattern as shown in FIG. 1. Clearly, the invention is also applicable to other patterns of spatial sub-sampling of colour components. As is well understood, the Bayer Mask 101 is positioned in front of a monochromatic image sensor 102, with pixel values of the sensor being taken to a processor 103, which, inter alia, generates the required output pixel values.

Figure 2:
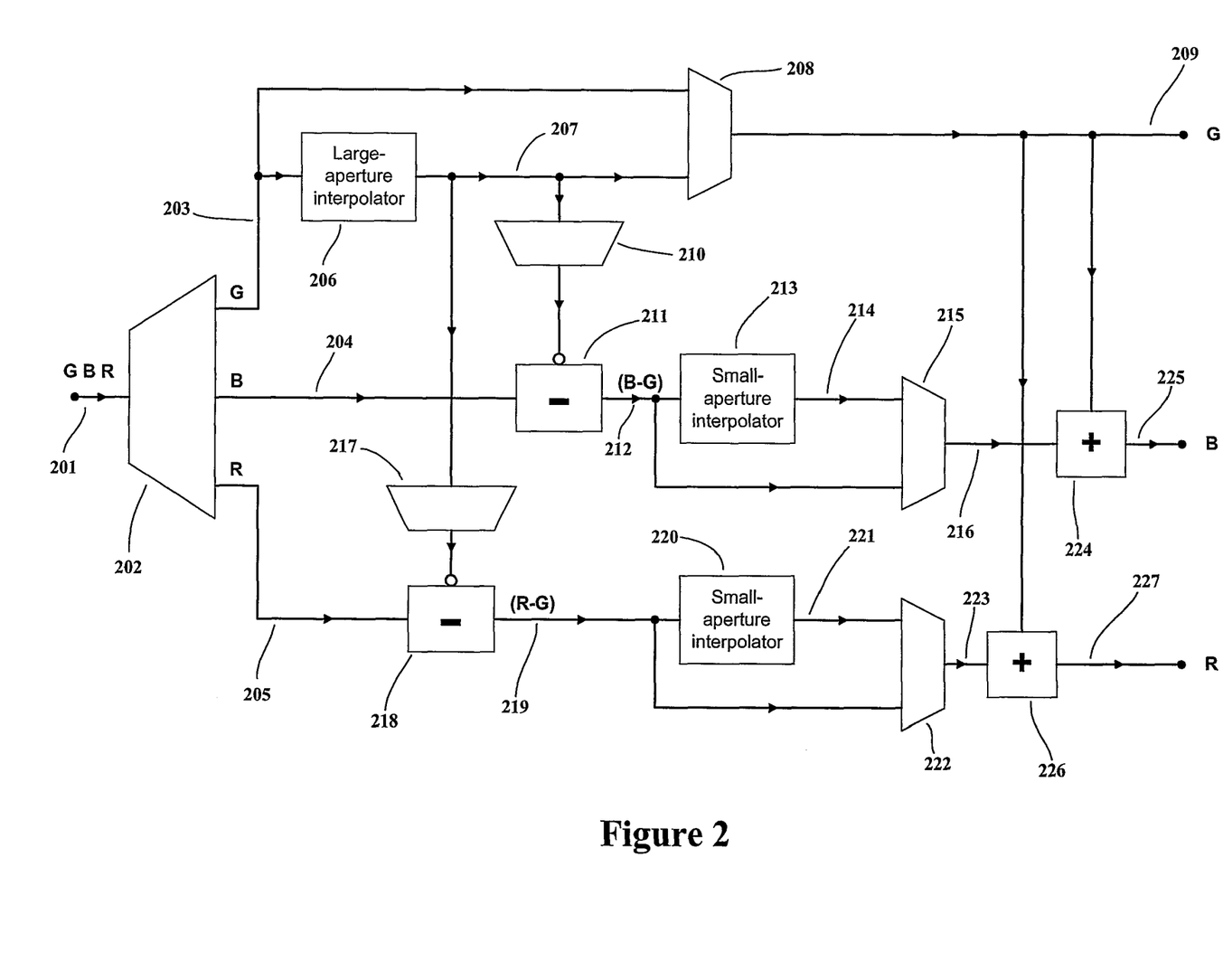
FIG. 2 shows a colour component pixel interpolator according to an embodiment of the invention.

Referring to FIG. 2, input data (201), representing the values of colour component pixels arranged in the pattern of FIG. 1, is demultiplexed (202) into three sets of primary colour component data: green pixel data (203), blue pixel data (204) and red pixel data (205).

The green pixel data (203) is passed to a two-dimensional spatial interpolator, or filter, (206) which interpolates green-component values (207) for the "missing" pixels, i.e. the red- and blue-component pixels in the data (201) which were not demultiplexed to the data (203).

Figure 3A:
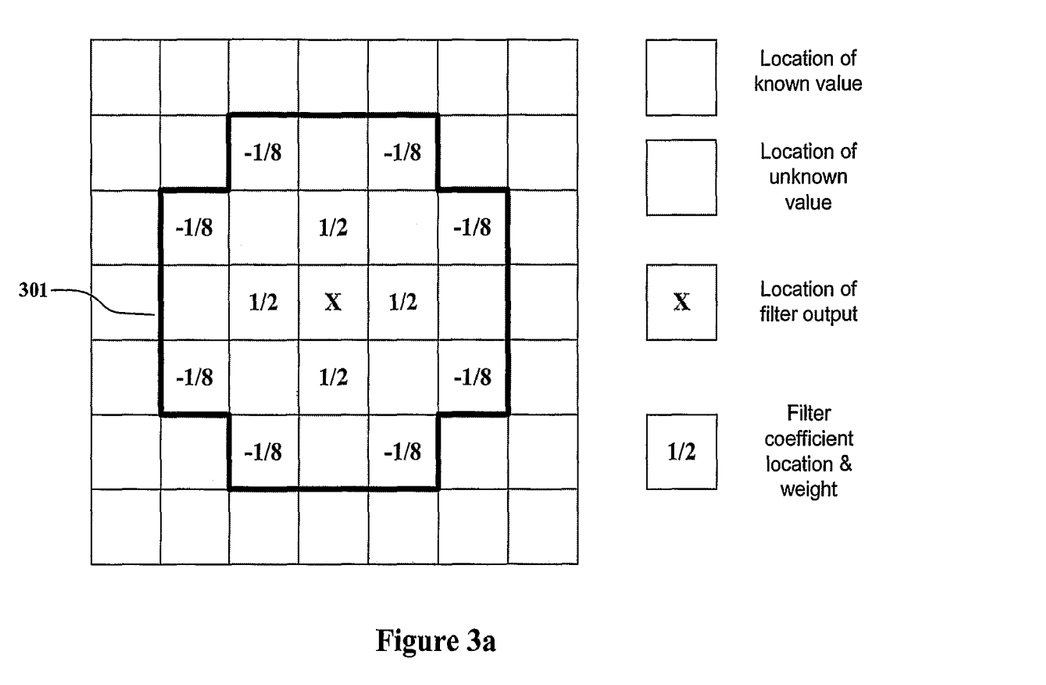
FIG. 3a shows a filter aperture and coefficients of a two-dimensional spatial interpolator.

The interpolator (206) calculates the required green-component value for each pixel missing a green-component value from a weighted sum of input pixels with green-component values according to a filter aperture extending at least two pixel positions away from the position of the output pixel. It is important that the interpolator filter has a relatively flat pass-band and it will therefore preferably include some negative coefficients. A suitable filter aperture and its coefficients are shown in FIG. 3a, and the extent of the filter aperture is shown (301).

It is also advantageous to exploit the difference between the sampling patterns for the respective colour components. In the "Bayer" pattern of FIG. 1 the green pixels have a diagonal pattern whereas the blue and red pixels both have horizontal and vertical patterns. The interpolator (206) has green input pixels and therefore, preferably, has a diagonal spatial stop-band, i.e. the cut-off frequencies for horizontal and vertical spatial frequencies are higher than the cut-off frequencies for diagonal spatial frequencies. It is also advantageous if this filter has a "non-variables-separable" spatial frequency response, i.e. a response which cannot be obtained by convolution of a horizontal filer with a vertical filter.

Returning to FIG. 2, the original green pixel values (203) are combined with the interpolated green pixel values (207) in a multiplexer (208) to produce green-component pixel values (209) for all positions of the mask.

In an alternative embodiment the interpolator (206) could also output filtered versions of its input pixels, and the multiplexer (208) would not be needed because all the pixel values (209) would be output from the interpolator (206). In this case a suitable interpolation filter aperture could be obtained by convolving the filter of FIG. 3a with a low-pass filter having a relatively high cut-off frequency and slow rate of cut.

The advantage of this alternative is that all the pixels (209) are filtered with substantially the same spatial frequency response. The filter characteristic to be applied (in the interpolator (206)) to those pixels (209) which are co-sited with pixels (203) should be selected to have substantially the same frequency response (particularly at lower frequencies) as that applied to the non-co-sited pixels (209). This avoids impairments to the image due to differences between these two types of pixel.

A multiplexer (210) selects the interpolated green-component values for the those pixels at the blue positions of the mask. These selected values are subtracted (211) from the blue-component of the original blue-component pixels (204) to give Blue minus Green (B–G) values for these positions (212). A spatial interpolator (213) interpolates (B–G) values for the remaining pixel positions i.e. for the original green-component pixels (203) and original red-component pixels (205).

The interpolator (213) calculates the required (B–G) values for the remaining pixel positions from a weighted sum of (B–G) values at the original blue-component pixel positions (212) according to a filter aperture that is smaller than that of the interpolator (206), and preferably extends no more than one pixel position away from the position of the output pixel. Typical filter apertures are shown in FIGS. 3b, 3c and 3d, and their respective extents are shown at (302), (303) and (304) respectively.

Figure 3B:
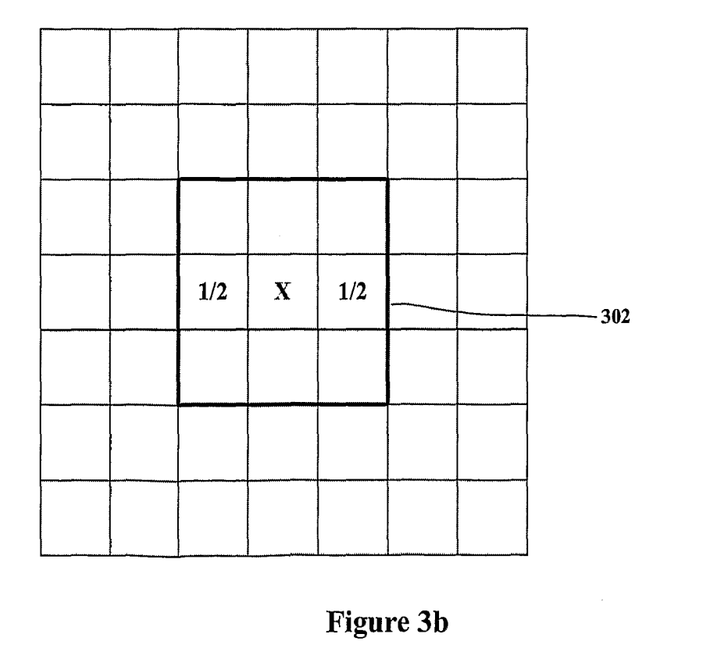
FIGS. 3b, 3c and 3d show three alternative spatial interpolator filter apertures and coefficients.

The filter of FIG. 3b is suitable for interpolating (B–G) values at original green-component pixel positions in the blue/green rows of the mask. In this case there are only two available (B–G) values no more than one pixel position away from the output position, and they are averaged to obtain the output value.

Figure 3C:
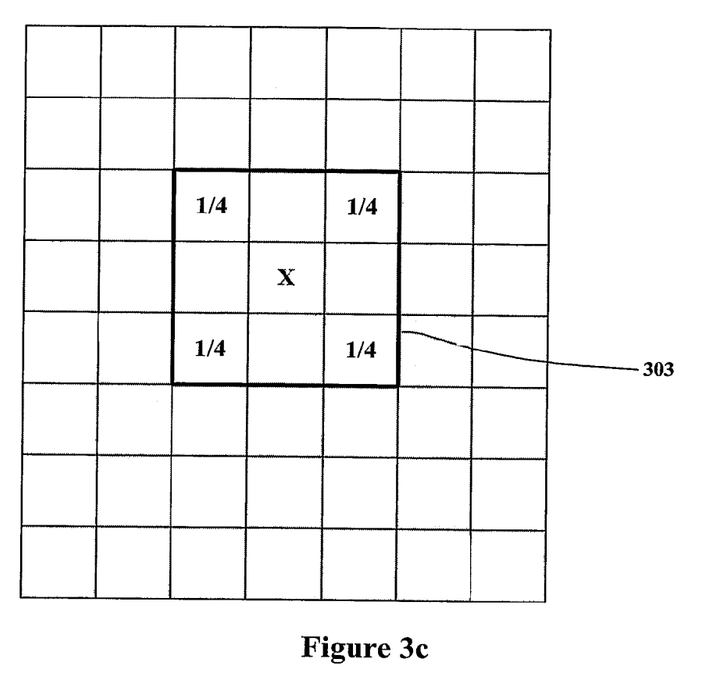

The filter of FIG. 3c is suitable for interpolating (B–G) values at original red-component pixel positions in the mask; in this case there are four available (B–G) values no more than one pixel position away from the output position, and they are averaged to obtain the output value.

Figure 3D:
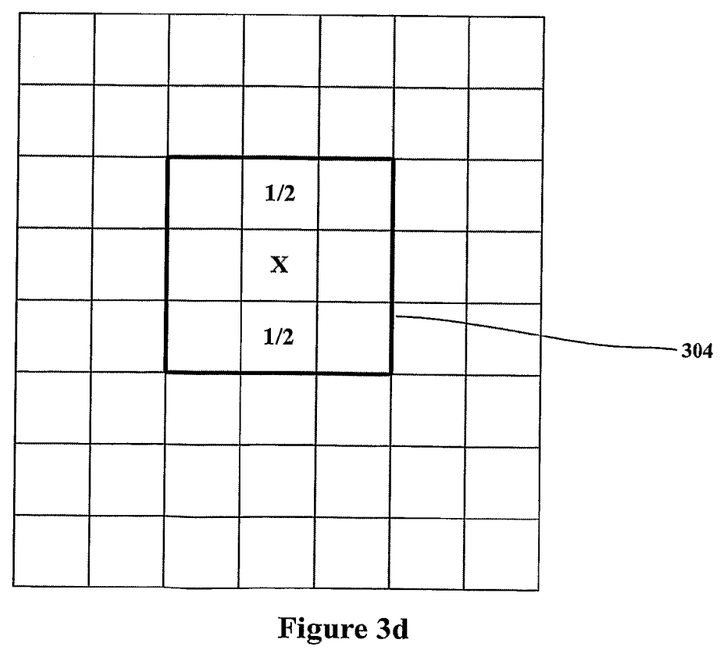

The filter of FIG. 3d is suitable for interpolating (B–G) values at original green-component positions in the red/green rows of the mask; in this case there are two available (B–G) values no more than one pixel position away from the output position, and they are averaged to obtain the output value.

The interpolated values (214) are input to a multiplexer (215) which combines them with the (B–G) values (212) at the original blue component pixel locations to give (B–G) values for every pixel position (216).

In an alternative embodiment the interpolator (213) could also output filtered versions of its input pixels, and the multiplexer (215) would not be needed because all the pixel values (216) would be output from the interpolator (213). The necessary filter could be derived from the filters shown by convolution with a low-pass filter as described above. As explained above (for the interpolator (206)) the objective is to apply substantially similar spatial frequency responses to all the pixel values (216).

(R–G) values for every pixel position are derived in an exactly analogous way to the above-described derivation of the (B–G) values. A multiplexer (217) selects those of the interpolated green component values (207) for those pixels at red positions of the mask. These green component values (207) are subtracted (218) from the red component of the original red input pixels (205) to give (R–G) values (219) at the original red-component pixel positions. The (R–G) component values (219) are interpolated (220) to provide additional (R–G) component values (221) at the original blue- and green-component pixel positions. The interpolated (R–G) component values (221) are combined (222) with the (R–G) values at the original red-component pixels (219) to give (R–G) values for every pixel position (223).

The operation of interpolator (220) is the same as that of the interpolator (212) except for the fact that its input samples are located at red positions of the mask and interpolated output samples are required at blue and green mask positions. The alternative embodiment, in which all the samples (223) are filtered in the interpolator (220) so that there are no substantial differences in the applied spatial frequency characteristics, is equally suitable.

Finally, the (B–G) values for every pixel (216) are added (224) to the green values (209) to give a blue value output for every pixel (225); and the (R–G) values for every pixel (223) are added (226) to the green values (209) to give a red value output for every pixel (227).

The invention described in the exemplary embodiment above thus provides a simple and effective method of spatial interpolation of pixel colour component values.

The invention has been described by way of example and other embodiments of the inventive concept are possible. For example there is no need for any of the output pixels (209) (225) and (227) to be co-sited with any of the input pixels (201) provided that the interpolators (206) (213) and (220) produce values at the required output pixel locations. Although it is important that co-sited pixels are available for input to the subtractors (211) and (217), there is no need for the pixel positions for which subtraction takes place to correspond to output pixel positions.

The green pixels (203) could be interpolated to a higher resolution than the total number of pixels in the mask, and the number of interpolated colour difference values increased to obtain R, G and B values at this higher resolution.

Alternatively the invention could be used to provide a down-sampled output in which the output is at a lower resolution. In this case the characteristics of the interpolators (206) (213) and (220) will preferably need to be chosen to reject the alias components that would otherwise result.

In further embodiments, more or less than three primary colour components could be used; only one lower resolution component could be interpolated; and colours other than red green and blue could be used as primaries.

The invention claimed is:

1. A method comprising:
   spatially interpolating, by a computing system comprising computer hardware, first color component pixel values of an image using a first filter having a first aperture to obtain interpolated first color component pixel values for respective second color component pixels, wherein the first filter comprises a diagonal filter having at least one negative coefficient value;
   determining intermediate values by calculating a difference between respective interpolated first color component pixel values and respective second color component pixel values of the respective second color component pixels;
   spatially interpolating the intermediate values by using a second filter having a second aperture smaller than the first aperture to obtain respective interpolated intermediate values for respective second color component pixels; and,
   summing respective interpolated intermediate values with the first color component pixel values of respective first color component pixels to obtain spatially interpolated pixel values for respective second color component pixels.

2. The method of claim 1, further comprising:
   spatially interpolating the first color component pixel values to obtain interpolated first color component pixel values for respective third color component pixels;
   determining second intermediate values from respective interpolated first color component pixel values and respective third color component pixel values of the respective third color component pixels;
   spatially interpolating the second intermediate values to obtain respective second interpolated intermediate values for respective third color component pixels; and
   combining respective second interpolated intermediate values with the first color component pixel values of the respective first color component pixels to obtain spatially interpolated pixel values for respective third color component pixels.

3. A method according to claim 1 in which a spatial sampling frequency of output pixels in any direction is higher than that of input pixels.

4. A method according to claim 1 in which a spatial sampling frequency of output pixels in any direction is lower than that of input pixels.

5. A method according to claim 1 in which the first filter has a non-variables-separable spatial frequency response.

6. A method according to claim 1 in which a shape of a spatial frequency response of the first filter is related to a pattern of its input pixels, so that a direction of lowest spatial frequency response of the first filter corresponds to a direction of lowest spatial frequency of the pattern of its input pixels.

7. An apparatus comprising:
   means for spatially interpolating first color component pixel values of an image using a first filter having a first aperture to obtain, at least, interpolated first color component pixel values for respective second color component pixels, wherein the first filter comprises a diagonal filter having at least one negative coefficient value;
   means for determining intermediate values by calculating a difference between respective interpolated first color component pixel values and respective second color component pixel values of the respective second color component pixels;
   means for spatially interpolating the intermediate values by using a second filter having a second aperture smaller than the first aperture to obtain respective interpolated intermediate values for, at least, respective second color component pixels; and
   means for summing respective interpolated intermediate values with the first color component pixel values of respective first color component pixels to obtain spatially interpolated pixel values for respective second color component pixels.

8. An apparatus as claimed in claim 7 further comprising:
   means for spatially interpolating the first color component pixel values of the first color component pixels to obtain, at least, interpolated first color component pixel values for respective third color component pixels;

means for generating second intermediate values from respective interpolated first color component pixel values and respective third color component pixel values of the respective third color component pixels;

means for spatially interpolating the second intermediate values to obtain respective second interpolated intermediate values for, at least, respective third color component pixels; and means for combining respective second interpolated intermediate values with the first color component pixel values of the respective first color component pixels to obtain spatially interpolated pixel values for respective third color component pixels.

9. An apparatus according to claim 8 in which the second filter and/or the means for spatially interpolating the second intermediate values has a filter aperture having no negative coefficient values.

10. An apparatus according to claim 7 wherein the first filter comprises an interpolation filter with a non-variables-separable spatial frequency response.

11. An apparatus according to claim 7 wherein the first filter comprises an interpolation filter with a spatial frequency response shape related to a pattern of its input pixels, so that a direction of lowest spatial frequency response of the filter corresponds to a direction of lowest spatial frequency of the pattern of its input pixels.

12. An apparatus according to claim 7 in which a spatial sampling frequency of pixels output by the apparatus in any direction is higher than a spatial sampling frequency of pixels input to the apparatus.

13. An apparatus according to claim 7 in which a spatial sampling frequency of pixels output by the apparatus in any direction is lower than a spatial sampling frequency of pixels input to the apparatus.

14. An apparatus comprising a monochromatic image sensor array, a filter arrangement disposed in relation to the sensor array to provide color discrimination and a processor constructed and adapted to spatially interpolate pixel values in a method according to claim 1.

15. A method of spatially interpolating pixel values of an image, the method comprising:

spatially interpolating green pixel values of an image using a first filter having a first aperture to obtain interpolated green pixel values for respective blue or red pixels, wherein the first filter comprises a diagonal filter having at least one negative coefficient value;

determining intermediate values by calculating a difference between respective interpolated green pixel values and respective blue or red pixel values of the respective blue or red pixels;

spatially interpolating the intermediate values by using a second filter having a second aperture smaller than the first aperture to obtain respective interpolated intermediate values for respective blue or red pixels; and, summing respective interpolated intermediate values with the green pixel values of respective green pixels to obtain spatially interpolated pixel values for the blue or red pixels.

* * * * *